R. E. RUNNER.
ANIMAL FEEDING DEVICE.
APPLICATION FILED FEB. 8, 1910.
965,602.
Patented July 26, 1910.
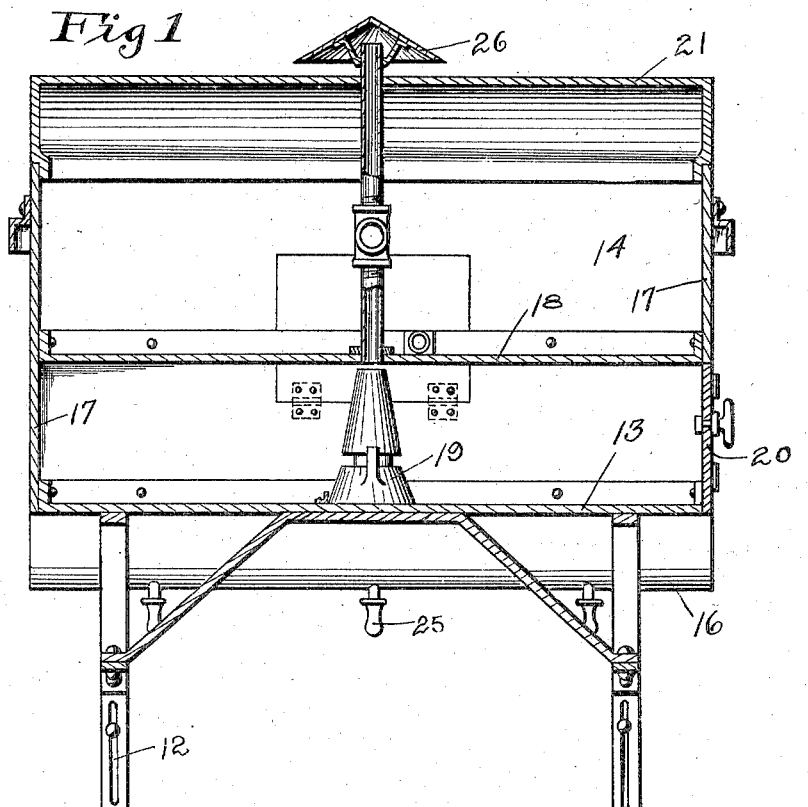
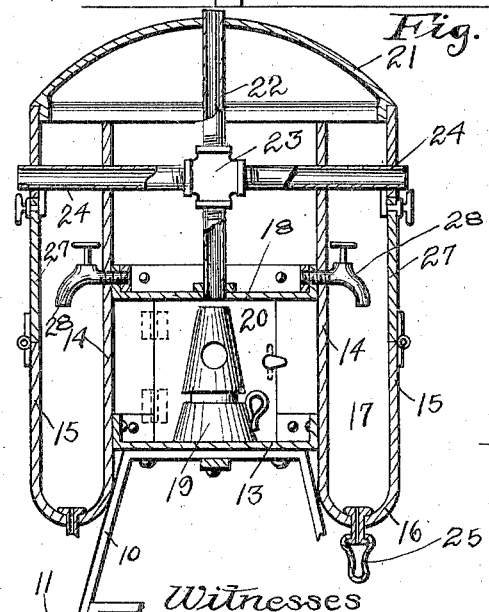
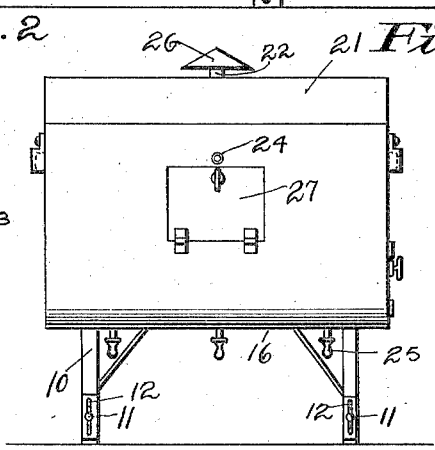
Witnesses
F. C. Caswell
W. A. Loftus.
Inventor
Ralph E. Runner
by J. Ralph Onvig Atty.

UNITED STATES PATENT OFFICE.

RALPH E. RUNNER, OF INDIANOLA, IOWA.

ANIMAL-FEEDING DEVICE.

965,602. Specification of Letters Patent. Patented July 26, 1910.

Application filed February 8, 1910. Serial No. 542,791.

*To all whom it may concern:*

Be it known that I, RALPH E. RUNNER, a citizen of the United States, residing at Indianola, in the county of Warren and State of Iowa, have invented a certain new and useful Animal-Feeding Device, of which the following is a specification.

The object of my invention is to provide a simple, durable and inexpensive device for warming milk or other liquid foods and for conveniently and easily delivering same through suitable rubber nipples to young animals.

More specifically it is my object to provide a device of this kind that may be readily and quickly adapted for feeding animals of various kinds such as calves, lambs and pigs, and also to provide a device in which a comparatively large quantity of milk or other liquid may be contained and kept in heated condition and a measured quantity thereof may be placed in position where it is accessible to the young animals so that they may be fed frequently in small quantities without the necessity of the operator handling a large quantity of milk or other liquid food each time that the animals are to be fed.

A further object is to provide a device of this kind which may be adapted to feed different numbers of young animals.

My invention consists in certain details, in the construction, arrangement and combination of the various parts of the device whereby the objects contemplated are attained, as hereinafter more fully set forth, pointed out in my claim and illustrated in the accompanying drawings, in which:

Figure 1 shows a vertical, longitudinal, sectional view through a device embodying my invention. Fig. 2 shows a transverse, sectional view through same, and Fig. 3 shows a side elevation.

Referring to the accompanying drawings, I have used the reference numeral 10 to indicate the supporting legs of the device which legs are made longitudinally adjustable by means of the thumb nuts 11 in the slots 12. Supported on top of the legs is a bottom piece 13. Secured to both sides of this bottom piece is a delivering chamber for liquid foods. This chamber comprises an inner wall 14 and an outer wall 15 and the bottom thereof is mounted at 16. The chamber is also provided with solid ends 17 and is open at its top. Mounted between the inner walls 14 of said delivering chambers is a bottom 18 for the main liquid food compartment extending from one end of the device to the other thus forming a space between the bottom 18 and the bottom 13 to receive a heating lamp 19 which heating lamp may be admitted into said heating space through the door 20 at one end of the device.

Mounted on top of the outer walls 15 is a detachable cover 21 and extended through the cover 21 and through the bottom 18 is a heat pipe 22 provided at its central portion with a fourway pipe connection 23, and two pipes 24 are inserted in this connection. One of them is extended through both walls of one of the delivering compartments and the other is extended through both walls of the other delivering compartment to discharge into the outside atmosphere.

At the bottom of each of the delivering compartments is a series of rubber nipples 25 of ordinary construction and on top of the heat pipe 22 is a hood 26, which hood is mounted on the pipe so that it may be removed prior to the removal of the cover 21.

At the side of each of the delivering compartments is an opening provided with a door 27 and this door may readily and easily be opened and swung outwardly and downwardly to provide access to the interior of the delivering compartment. Mounted in the compartment for containing the milk or other liquid food is a faucet 28 arranged to discharge into the bottom of the delivering compartment. A similar faucet is provided for each of the delivering compartments.

In practical use the operator first places a comparatively large quantity of milk or other liquid food in the containing compartment. This is done by first removing the cover 21. In practice a sufficient quantity is usually placed in the device at one time to furnish a day's supply for the animals; then the lamp 19 may be removed through the door 20 and the lamp ignited and placed in position directly under the pipe 22. The heat from the lamp will rise through said pipe 22 and it will also pass through the laterally extended pipes 24 and thus it will heat the milk or other liquid food and at the same time warm the delivering compartments by radiation from said pipes. When the milk or other liquid food is about the proper temperature and when the operator desires to feed young animals he then opens one of the doors 27 and opens the adjacent faucet 28 and permits a sufficient quantity of the milk or other liquid food to run into the bottom of the delivering compartment for the purpose of giving the animals to be fed their milk. Then the faucet is closed and the animals to be fed may remove the contents of the delivering compartment through the nipples 25 on one side; then the same operation is carried out in regard to the delivering compartment on the other side. In this way a greater or less number of animals may be accommodated at one time. After the milk or other liquid food is withdrawn from the other delivering compartments, the remainder in the containing compartment will be kept in a heated condition until it is time to feed the animals again.

By means of this device it is obvious that the young animals may be fed at frequent intervals with a minimum of attention on the part of the operator as all he needs to do is to open the door 27 and turn the faucet 28 and he does not have to handle any large quantity of milk or other liquid food nor provide any means for heating it other than that provided by the heating device itself. Furthermore none of the liquid food is wasted at any time for the reason that the operator places in the delivering compartment only so much at one time as the animals will remove from the delivering compartment. If the animals to be fed are quite small the legs are adjusted so that the nipples will stand just at the proper distance from the floor of the building in which the feeding is being done, or if the animals to be fed are larger the position of the nipples may be raised.

I claim as my invention:

A feeding device of the class described, comprising a body portion having a compartment designed to contain liquid foods, means for supporting a lamp below the compartment to heat it, a delivering compartment at the side of the containing compartment, a nipple in the bottom thereof, means for providing access to the interior of the delivering compartment, and a faucet communicating with the containing compartment and designed to discharge into the delivering compartment, for the purposes stated.

RALPH E. RUNNER.

Witnesses to signature:
H. H. McNEIL,
HUGH QUINN.